United States Patent
Nakanishi

(10) Patent No.: US 9,503,136 B2
(45) Date of Patent: Nov. 22, 2016

(54) RECEIVER AND RECEIVING METHOD OF RECEIVER

(71) Applicant: LAPIS Semiconductor Co., Ltd., Yokohama (JP)

(72) Inventor: Seiji Nakanishi, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 14/977,706

(22) Filed: Dec. 22, 2015

(65) Prior Publication Data

US 2016/0191090 A1 Jun. 30, 2016

(30) Foreign Application Priority Data

Dec. 25, 2014 (JP) .................................. 2014-262468

(51) Int. Cl.
*H04L 1/00* (2006.01)
*H04B 1/10* (2006.01)

(52) U.S. Cl.
CPC .................................. *H04B 1/1027* (2013.01)

(58) Field of Classification Search
CPC .. H04B 1/109; H04B 1/1027; H04B 1/0075; H04B 1/0082; H04B 1/0092; H04B 1/001; H04B 2001/1072; H04B 27/2647; H04B 1/10

USPC ................. 375/346, 316; 455/307, 339, 266, 455/226.1, 226.2

See application file for complete search history.

(56) References Cited

U.S. PATENT DOCUMENTS

2010/0255799 A1* 10/2010 Casagrande ........ H04L 27/1525 455/160.1

FOREIGN PATENT DOCUMENTS

JP 2007-081708 A 3/2007

* cited by examiner

*Primary Examiner* — Rahel Guarino
(74) *Attorney, Agent, or Firm* — Rabin & Berdo, P.C.

(57) ABSTRACT

It is determined, on the basis of a signal component of a low frequency band and a signal component of a desired channel band of an intermediate frequency signal, whether an interfering wave is a far-off interfering wave which exists out of a low frequency band, an out-of-channel-band interfering wave which exists out of a channel band, or an in-channel-band interfering wave which exists in the channel band. When the interfering wave is determined to be the far-off interfering wave, the operation current of a circuit in the receiver is made lower than those in a case where the interfering wave is the out-of-channel-band or in-channel-band interfering wave.

9 Claims, 6 Drawing Sheets

FIG.3

| RFDT | IFDT | IFXDT | STATE OF INTERFERING WAVE | CONTROL | |
|---|---|---|---|---|---|
| | | | | PC | BC |
| 0 | 0 or 1 | 0 or 1 | NO SIGNAL | MAINTAIN | |
| 1 | 0 | 0 | FAR-OFF INTERFERENCE | SMALL CURRENT $I_L$ | NARROW BAND $B_{NA}$ |
| 1 | 1 | 0 | OUT-OF-CHANNEL-BAND INTERFERENCE | MIDDLE CURRENT $I_M$ | |
| 1 | 1 | 1 | NO INTERFERENCE, IN-CHANNEL-BAND INTERFERENCE | LARGE CURRENT $I_H$ | WIDE BAND $B_{WD}$ |

RECEIVER AND RECEIVING METHOD OF RECEIVER

BACKGROUND OF THE INVENTION

1. Field of the Invention

The present invention relates to a receiver, and more specifically to a receiver that receives and decodes a signal transmitted by radio, and to a receiving method of the receiver.

2. Description of the Related Art

Such a receiver includes a mixer that converts a radio frequency (RF) signal received by an antenna into a signal in an intermediate frequency (IF) band. The mixer mixes an amplification signal of the RF signal with a local oscillation signal generated by a local oscillation circuit, to generate the intermediate frequency signal in the IF band.

It is desired that receivers contained in cellular phones, movable transceivers, and the like driven by batteries have reduced power requirements to allow a long period of use. Thus, for the purpose of reducing the power requirements, there has been proposed a receiver in which an operation current of a voltage controlled oscillator (VCO) contained in a local oscillation circuit is controlled on the basis of a difference value between signals before and after passing a low-pass filter for removing a noise component, which corresponds to interfering waves contained in a received signal, in other words, on the basis of the levels of the interfering waves (for example, see Japanese Patent Application Laid-Open No. 2007-81708).

However, in the receiver described above, when the interfering waves are at high levels, the operation current of the VCO increases and thus it is difficult to significantly reduce electric power consumption.

SUMMARY OF THE INVENTION

An object of the present invention is to provide a receiver and a receiving method that are resistant to adverse effects of interfering waves and able to reduce electric power consumption.

A receiver according to the present invention includes: an amplifying circuit for amplifying a received high frequency signal to obtain a reception signal; a local oscillation circuit for generating a local oscillation signal; a mixing circuit for mixing the reception signal with the local oscillation signal to generate a first intermediate frequency signal; a low-pass filter circuit for obtaining a component of a low frequency band of the first intermediate frequency signal, as a second intermediate frequency signal; a band-pass filter circuit for obtaining a component of a desired channel band of the second intermediate frequency signal, as a selected intermediate frequency signal; an interfering wave determining unit for determining that a far-off interfering wave exists out of the low frequency band when a level of the second intermediate frequency signal is lower than a first threshold value and a level of the selected intermediate frequency signal is lower than a second threshold value, determining that an out-of-channel-band interfering wave exists out of the channel band when the level of the second intermediate frequency signal is equal to or higher than the first threshold value and the level of the selected intermediate frequency signal is lower than the second threshold value, and determining that the an in-channel-band interfering wave exists in the channel band when the level of the second intermediate frequency signal is equal to or higher than the first threshold value and the level of the selected intermediate frequency signal is equal to or higher than the second threshold value; and a controller that, when the interfering wave determining unit has determined that the far-off interfering wave exists, makes an operation current of at least one circuit among the amplifying circuit, the mixing circuit, the low-pass filter circuit, and the band-pass filter circuit lower than that in a case where it is determined that the out-of-channel-band interfering wave or the in-channel-band interfering wave exists.

In a receiving method of a receiver according to the present invention, the receiver includes: an amplifying circuit for amplifying a received high frequency signal to obtain a reception signal; a local oscillation circuit for generating a local oscillation signal; a mixing circuit for mixing the reception signal with the local oscillation signal to generate a first intermediate frequency signal; a low-pass filter circuit for obtaining a component of a predetermined low frequency band of the first intermediate frequency signal, as a second intermediate frequency signal; and a band-pass filter circuit for obtaining a component of a desired channel band of the second intermediate frequency signal, as a selected intermediate frequency signal. The receiving method includes: an interfering wave determining step of determining that a far-off interfering wave exists out of the low frequency band when a level of the second intermediate frequency signal is lower than a first threshold value and a level of the selected intermediate frequency signal is lower than a second threshold value, determining that an out-of-channel-band interfering wave exists out of the channel band when the level of the second intermediate frequency signal is equal to or higher than the first threshold value and the level of the selected intermediate frequency signal is lower than the second threshold value, and determining that an in-channel-band interfering wave exists in the channel band when the level of the second intermediate frequency signal is equal to or higher than the first threshold value and the level of the selected intermediate frequency signal is equal to or higher than the second threshold value; and a control step of, when it is determined that the far-off interfering wave exists in the interfering wave determining step, making an operation current of at least one circuit among the amplifying circuit, the mixing circuit, the low-pass filter circuit, and the band-pass filter circuit lower than that in a case where it is determined that the out-of-channel-band interfering wave or the in-channel-band interfering wave exists.

According to the present invention, it is determined that whether the interfering wave is a far-off interfering wave which exists out of the low frequency band, an out-of-channel-band interfering wave which exists out of the channel band, or an in-channel-band interfering wave which exists within the channel band, on the basis of the signal component of the low frequency band and the signal component of the desired channel band of the intermediate frequency signal. At this time, if the interfering wave is the far-off interfering wave, the operation current of a circuit (amplifier, mixer, LPF, or BPF) in the receiver is made lower than that in a case where the interfering wave is the out-of-channel-band interfering wave or the in-channel-band interfering wave. Thereby, when the interfering wave is out of the low frequency band and is removable by the LPF, the operation current is decreased to reduce electric power consumption. On the other hand, when the interfering wave is the out-of-channel-band interfering wave or the in-channel-band interfering wave and is not removable by the LPF, the operation current is increased to enhance a resistance to the interfering wave.

Therefore, according to the present invention, it is possible to provide the receiver that is resistant to adverse effects of the interfering wave, irrespective of the level of the interference wave, and able to reduce the electric power consumption.

BRIEF DESCRIPTION OF THE DRAWINGS

FIG. 3 is a table of determinations as to the state of interfering waves by an interfering wave determining unit 204 and control operations;

DETAILED DESCRIPTION OF THE EMBODIMENTS

Figure 1:
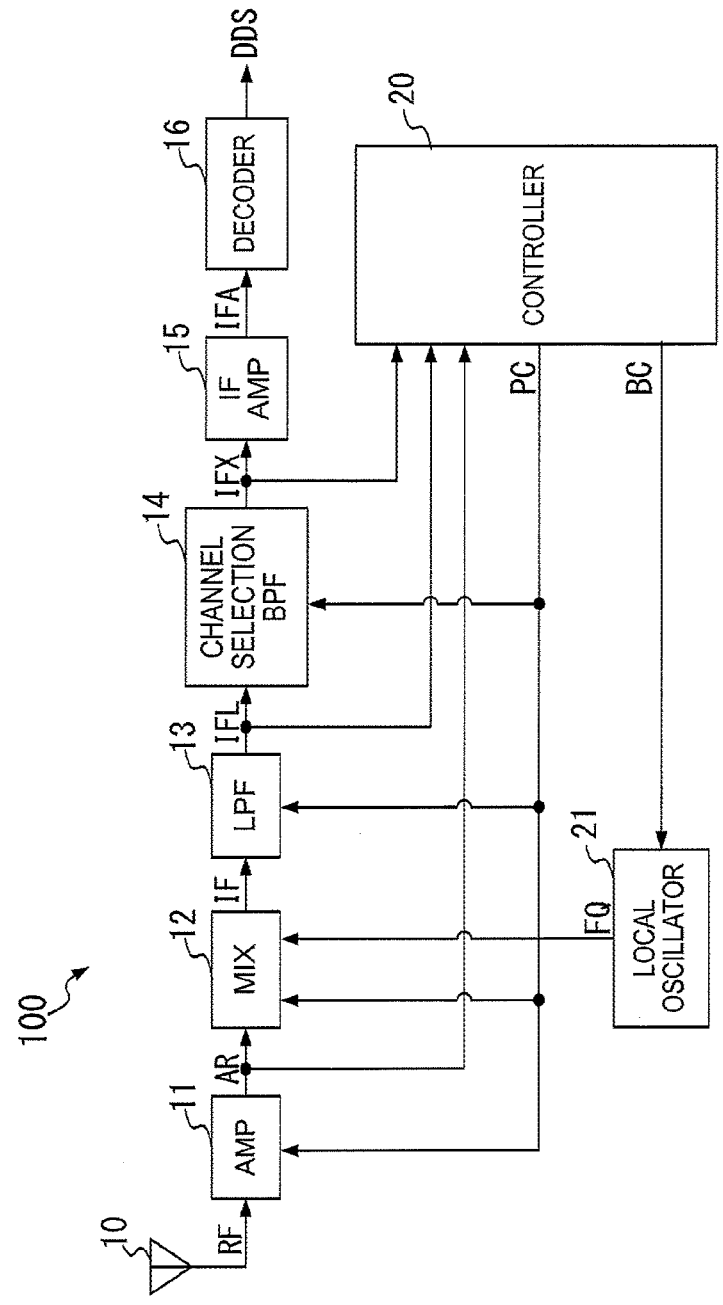
FIG. 1 is a block diagram showing the structure of a receiver according to the present invention.

FIG. 1 is the block diagram showing the entire structure of a receiver 100 according to the present invention.

In FIG. 1, an antenna 10 receives a transmission signal sent by radio from a transmitter (not shown). The high frequency signal RF received by the antenna 10 is supplied to an amplifier 11 which is a low-noise amplifying circuit.

The amplifier 11 amplifies the high frequency signal RF to obtain a reception signal AR, and supplies the reception signal AR to a mixer 12 which is a mixing circuit, and the controller 20.

The mixer 12 mixes the reception signal AR with a local oscillation signal FQ supplied from a local oscillation circuit 21 to generate an intermediate frequency signal IF in an intermediate frequency band, and supplies the intermediate frequency signal IF to the low-pass filter circuit (hereinafter referred to as an LPF) 13 and the controller 20.

The LPF 13 passes a component of a low frequency band, which is lower than a predetermined frequency band, out of the intermediate frequency signal IF to obtain an intermediate frequency signal IFL from which interfering waves are removed as an unnecessary high frequency component, and supplies the intermediate frequency signal IFL to a channel selection band-pass filter circuit (hereinafter referred to as a channel selection BPF) 14 and the controller 20.

The channel selection BPF 14 passes a component of a channel band that a user desires to receive out of the intermediate frequency signal IFL to obtain a selected intermediate frequency signal IFX, and supplies the selected intermediate frequency signal IFX to an intermediate frequency amplifying circuit 15 and the controller 20.

The intermediate frequency amplifying circuit 15 amplifies the selected intermediate frequency signal IFX to obtain an amplified intermediate frequency signal IFA, and supplies the amplified intermediate frequency signal IFA to a decoding circuit 16.

The decoding circuit 16 subjects the amplified intermediate frequency signal IFA to a decoding process to decode information or sound data transmitted by radio, and outputs the decoded information or sound data as a decoded data signal DDS.

The controller 20 generates a loop band adjustment signal BC and an operation current adjustment signal PC on the basis of the signal level of each of the reception signal AR, the intermediate frequency signal IFL, and the selected intermediate frequency signal IFX described above. The controller 20 supplies the loop band adjustment signal BC to the local oscillation circuit 21, and also supplies the operation current adjustment signal PC to the amplifier 11, the mixer 12, the LPF 13, and the channel selection BPF 14.

Figure 2:
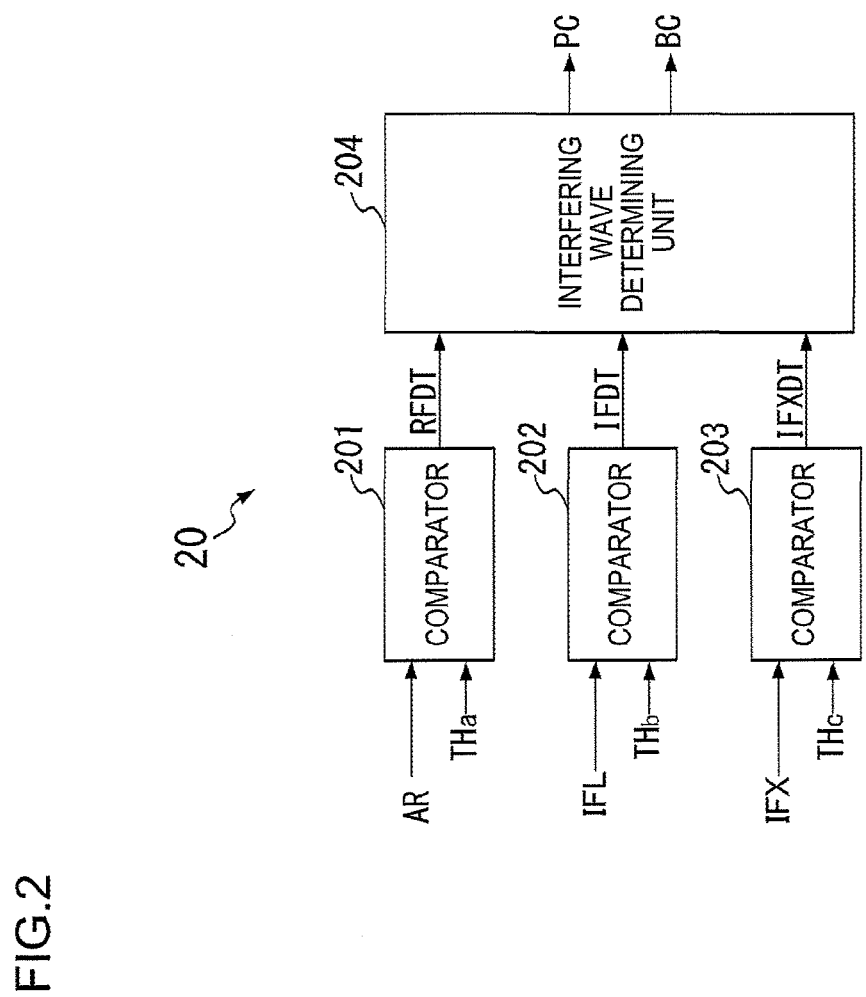
FIG. 2 is a block diagram showing a part of the internal structure of a controller 20.

FIG. 2 is the block diagram showing the part of the internal structure of the controller 20. As shown in FIG. 2, the controller 20 includes comparators 201 to 203 and an interfering wave determining unit 204.

The comparator 201 compares the level of the reception signal AR with a predetermined threshold value THa. The comparator 201 supplies, to the interfering wave determining unit 204, a reception level determination signal RFDT having a logic level of 1 when the level of the reception signal AR is equal to or higher than the threshold value THa, while supplies the reception level determination signal RFDT having a logic level of 0 when the level of the reception signal AR is less than the threshold value THa.

The comparator 202 compares the level of the intermediate frequency signal IFL with a predetermined threshold value THb. The comparator 202 supplies, to the interfering wave determining unit 204, an IF level determination signal IFDT having a logic level of 1 when the level of the intermediate frequency signal IFL is equal to or higher than the threshold value THb, while supplies the IF level determination signal IFDT having a logic level of 0 when the level of the intermediate frequency signal IFL is less than the threshold value THb.

The comparator 203 compares the level of the selected intermediate frequency signal IFX with a predetermined threshold value THc. The comparator 203 supplies, to the interfering wave determining unit 204, a selected IF level determination signal IFXDT having a logic level of 1 when the level of the selected intermediate frequency signal IFX is equal to or higher than the threshold value THc, while supplies the selected IF level determination signal IFXDT having a logic level of 0 when the level of the selected intermediate frequency signal IFX is less than the threshold value THc.

The interfering wave determining unit 204 determines the present state of the interfering waves on the basis of the reception level determination signal RFDT, the IF level determination signal IFDT, and the selected IF level determination signal IFXDT.

That is to say, as shown in FIG. 3, when the reception level determination signal RFDT is at a logic level of 0, the interfering wave determining unit 204 determines that the present state is a no signal state in which neither the interfering wave nor desired wave in the desired channel exist. At this time, the interfering wave determining unit 204 continues supplying the loop band adjustment signal BC to the local oscillation circuit 21, while maintaining the contents of the loop band adjustment signal BC in the present state. Furthermore, the interfering wave determining unit 204 continues supplying the operation current adjustment signal PC to the amplifier 11, the mixer 12, the LPF 13, and the channel selection BPF 14, while maintaining the contents of the operation current adjustment signal PC in the present state.

Figure 4:
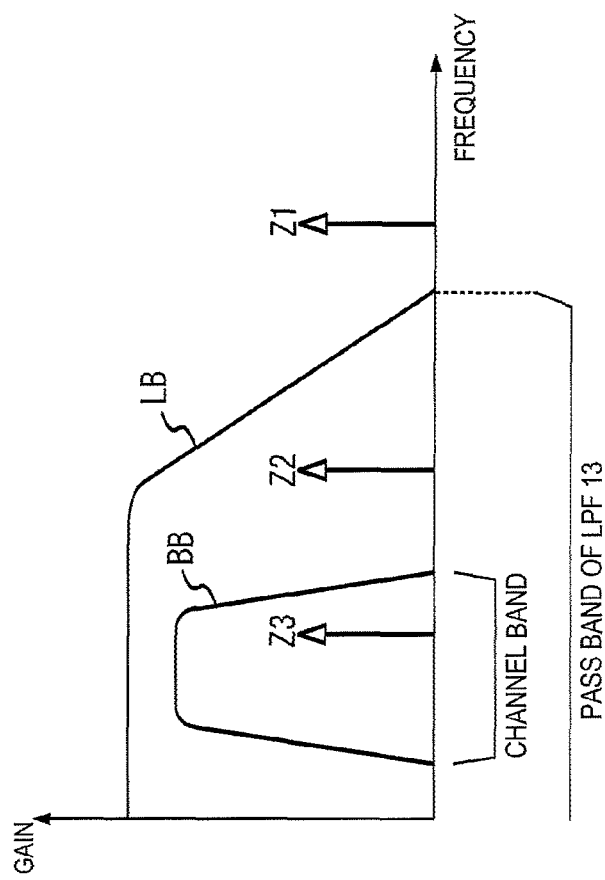
FIG. 4 is a graph showing the positional relationship of a channel band, a pass band of an LPF 13, a far-off interfering wave Z1, an out-of-channel-band interfering wave Z2, and an in-channel-band interfering wave Z3.

Also, as shown in FIG. 3, when the reception level determination signal RFDT is at a logic level of 1 and both of the IF level determination signal IFDT and the selected IF level determination signal IFXDT are at a logic level of 0, the interfering wave determining unit 204 determines that the present state is a state of "far off jammers", in which the interfering wave is in a band out of the pass band of the LPF 13. For example, as shown in FIG. 4, the interfering wave determining unit 204 determines that the interfering wave (i.e., far-off interfering wave) Z1 exists out of the pass band of the filter characteristics LB of the LPF 13. At this time, as shown in FIG. 3, the interfering wave determining unit 204 supplies, to the local oscillation circuit 21, the loop band adjustment signal BC that specifies a predetermined narrow band $B_{NA}$ as a loop band of a PLL circuit. Furthermore, as shown in FIG. 3, the interfering wave determining unit 204 supplies the operation current adjustment signal PC that specifies a predetermined small current $I_L$ as an operation current amount, to the amplifier 11, the mixer 12, the LPF 13, and the channel selection BPF 14.

Also, as shown in FIG. 3, when both of the reception level determination signal RFDT and the IF level determination signal IFDT are at a logic level of 1 and the selected IF level determination signal IFXDT is at a logic level of 0, the interfering wave determining unit 204 determines that the present state is a state of interference out of the channel band, in which the interfering wave is in a band within the pass band of the LPF 13 and out of the channel band. For example, as shown in FIG. 4, the interfering wave determining unit 204 determines that the interfering wave (i.e., out-of-channel-band interfering wave) Z2 exists within the pass band of the filter characteristics LB of the LPF 13 and out of the channel band based on band-pass characteristics BB of the channel selection BPF 14. At this time, as shown in FIG. 3, the interfering wave determining unit 204 supplies, to the local oscillation circuit 21, the loop band adjustment signal BC that specifies a wide band $B_{WD}$ wider than the above-described narrow band $B_{NA}$ as the loop band of the PLL circuit. Furthermore, as shown in FIG. 3, the interfering wave determining unit 204 supplies the operation current adjustment signal PC that specifies a middle current $I_M$ larger than the above-described small current $I_L$ as the operation current amount, to the amplifier 11, the mixer 12, the LPF 13, and the channel selection BPF 14.

Also, as shown in FIG. 3, when all of the reception level determination signal RFDT, the IF level determination signal IFDT, and the selected IF level determination signal IFXDT are at a logic level of 1, the interfering wave determining unit 204 determines that the present state is a no-interference state or a state of in-channel-band interference within the channel band, in which the interfering wave is within the channel band of the channel selection BPF 14. For example, as shown in FIG. 4, the interfering wave determining unit 204 determines that the interfering wave (i.e., in-channel-band interfering wave) Z3 exists within the channel band based on the band-pass characteristics BB of the channel selection BPF 14. At this time, as shown in FIG. 3, the interfering wave determining unit 204 supplies, to the local oscillation circuit 21, the loop band adjustment signal BC that specifies the above-described wide band $B_{WD}$ as the loop band of the PLL circuit. Furthermore, as shown in FIG. 3, the interfering wave determining unit 204 supplies the operation current adjustment signal PC that specifies a large current $I_H$ larger than the above-described middle current $I_M$ as the operation current amount, to the amplifier 11, the mixer 12, the LPF 13, and the channel selection BPF 14.

The local oscillation circuit 21 includes the PLL (phase locked loop) circuit 210, which generates the local oscillation signal FQ and supplies the local oscillation signal FQ to the mixer 12.

Figure 5:
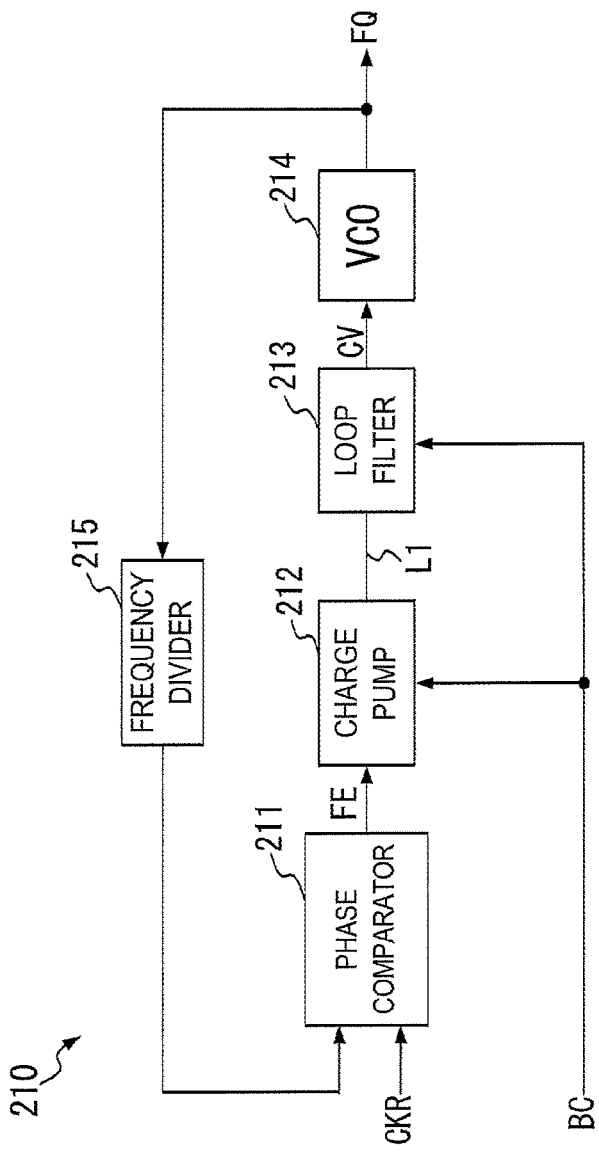
FIG. 5 is a block diagram showing the internal configuration of a PLL circuit 210 contained in a local oscillation circuit 21.

FIG. 5 is the block diagram showing the configuration of the PLL circuit 210. As shown in FIG. 5, the PLL circuit 210 has a phase comparator 211, a charge pump circuit 212, a loop filter 213, a VCO (voltage controlled oscillator) 214, and a frequency divider 215.

In FIG. 5, the phase comparator 211 generates a phase difference signal FE that represents the phase difference between a reference clock signal CKR and a divided oscillation signal DV, and supplies the phase difference signal FE to the charge pump circuit 212. In other words, when the divided oscillation signal DV has a phase delay with respect to the reference clock signal CKR, the phase comparator 211 supplies the phase difference signal FE that indicates the phase delay to the charge pump circuit 212. When the divided oscillation signal DV has a phase advance with respect to the reference clock signal CKR, the phase comparator 211 supplies the phase difference signal FE that indicates the phase advance to the charge pump circuit 212.

When the phase difference signal FE indicates the phase delay, the charge pump circuit 212 increases a voltage of a line L1 by feeding a positive charge pump output current to the line L1. On the other hand, when the phase difference signal FE indicates the phase advance, the charge pump circuit 212 decreases the voltage of the line L1 by feeding a negative charge pump output current to the line L1.

Note that, when the loop band adjustment signal BC specifying the narrow band $B_{NA}$ is supplied, the charge pump circuit 212 narrows a loop band of the loop filter 213 by decreasing the amount of the charge pump output current to be fed to the line L1. On the other hand, when the loop band adjustment signal BC indicating the wide band $B_{WD}$ is supplied, the charge pump circuit 212 increases the amount of the charge pump output current to be fed to the line L1. Thus, the loop band is widened in the loop filter 213, and a phase noise component generated in the charge pump circuit 212 is reduced.

The loop filter 213 converts the charge pump output current fed to the line L1 into a voltage, and supplies the voltage in which an unnecessary variation in a short period is blocked except in the loop band by smoothing, as a control voltage CV to the VCO 214.

It is noted that the loop filter 213 includes a low-pass filter having a variable cut-off frequency. When the loop band adjustment signal BC specifying the narrow band $B_{NA}$ is supplied, the loop filter 213 narrows its pass band by decreasing the cut-off frequency by a predetermined amount with respect to a reference pass band. On the other hand, when the loop band adjustment signal BC indicating the wide band $B_{WD}$ is supplied, the loop filter 213 widens its pass band by increasing the cut-off frequency by a predetermined amount with respect to the reference pass band.

The VCO 214 generates an oscillation signal having a frequency corresponding to the control voltage CV as the above-described local oscillation signal FQ, and supplies the oscillation signal to the frequency divider 215 and the mixer 12. The frequency divider 215 generates the above-described divided oscillation signal DV by dividing the frequency of the local oscillation signal FQ by a dividing ratio based on a dividing ratio setting signal, and supplies the divided oscillation signal to the phase comparator 211.

Among the various types of circuits shown in FIG. 1, the amplifier 11, the mixer 12, the LPF 13, and the channel selection BPF 14 each have an input circuit for receiving a signal supplied from a former stage.

Figure 6:
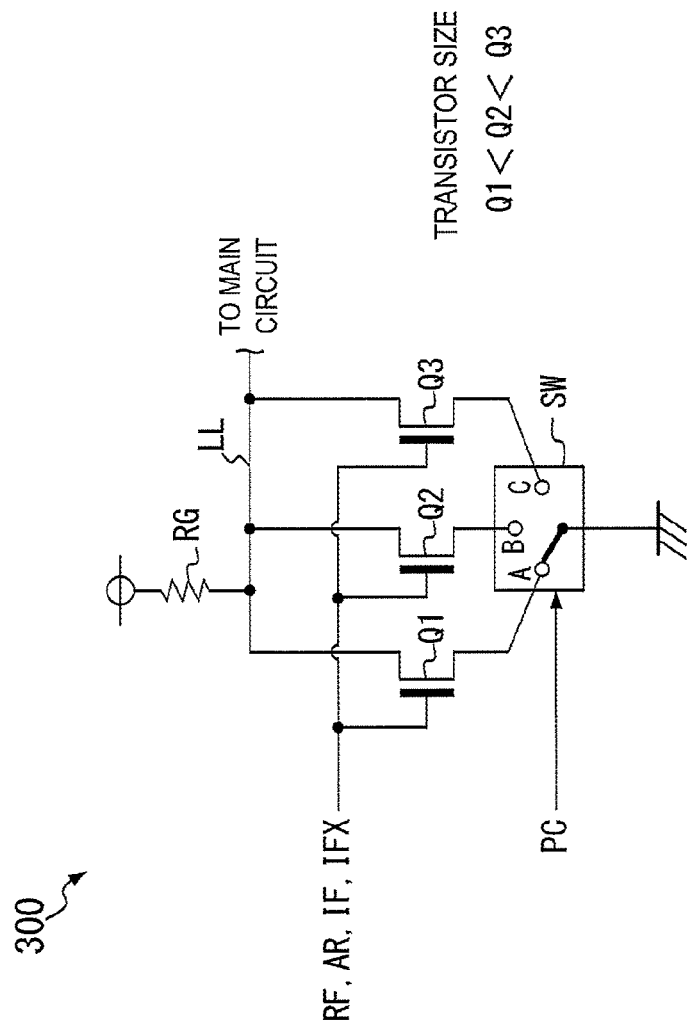
FIG. 6 is a circuit diagram showing the structure of an input circuit 300.

FIG. 6 is the circuit diagram showing an example of the input circuit 300 that is commonly provided in an input stage of each of the amplifier 11, the mixer 12, the LPF 13, and the channel selection BPF 14. In FIG. 6, a power supply voltage is applied to one end of a load resistance RG, and a line LL is connected to the other end thereof.

A drain of a MOS (metal oxide semiconductor) transistor Q1 is connected to the line LL, and a source thereof is connected to a terminal A of a switch SW. A drain of a MOS transistor Q2 is connected to the line LL, and a source thereof is connected to a terminal B of the switch SW. A drain of a MOS transistor Q3 is connected to the line LL, and a source thereof is connected to a terminal C of the switch SW. It is noted that the transistor Q3 is larger in size, that is, has a larger semiconductor area than the transistors Q1 and Q2. Moreover, the transistor Q2 is larger than the transistor Q1 in size.

The transistor Q3 is a large current output transistor that is able to output a larger current $I_H$ than the transistors Q1 and Q2, and the transistor Q2 is a middle current output transistor that is able to output a middle current $I_M$ larger than that of the transistor Q1. The transistor Q1 is a small current output transistor that is able to output a small current $I_L$ smaller than the middle current $I_M$.

To a gate of each of the transistors Q1 to Q3, an input signal (RF, AR, IF, or IFL) is supplied.

By the switch SW, only any one of the terminals A to C is grounded on the basis of the operation current adjustment signal PC. More specifically, when the operation current adjustment signal PC indicating the small current $I_L$ is supplied, the switch SW applies a ground potential to the source of the small current output transistor Q1 connected to the terminal A. When the operation current adjustment signal PC indicating the middle current $I_M$ is supplied, the switch SW applies a ground potential to the source of the middle current output transistor Q2 connected to the terminal B. When the operation current adjustment signal PC indicating the large current $I_H$ is supplied, the switch SW applies a ground potential to the source of the large current output transistor Q3 connected to the terminal C.

In the input circuit 300 having such a structure, which is contained in each of the circuits (11 to 14), the input signal (RF, AR, IF, or IFL) supplied from the former stage is amplified by one of the small current output transistor Q1, the middle current output transistor Q2, and the large current output transistor Q3, and sent out to a main circuit (not shown) through the line LL.

The operation of the controller 20 of the receiver 100 having the structure shown in FIGS. 1 to 6 will be hereinafter described.

First, the interfering wave determining unit 204 determines as to whether any one of the far-off interfering wave Z1, the out-of-channel-band interfering wave Z2 and the in-channel-band interfering wave Z3 is occurring on the basis of the reception level determination signal RFDT, the IF level determination signal IFDT, and the selected IF level determination signal IFXDT.

When it is determined that the far-off interfering wave Z1 is occurring, the controller 20 supplies the operation current adjustment signal PC indicating the small current $I_L$ to the input circuit 300 of each of the amplifier 11, the mixer 12, the LPF 13, and the channel selection BPF 14. Thus, the input circuit 300 performs an amplification process of the input signal by the small current output transistor Q1 among the three transistors Q1 to Q3. This is because the LPF 13 can remove the far-off interfering wave Z1. Thus, each of the amplifier 11, the mixer 12, the LPF 13, and the channel selection BPF 14 may have a low resistance to the interfering wave. In this case, the operation current of the input circuit 300 is lowered in each of the amplifier 11, the mixer 12, the LPF 13, and the channel selection BPF 14, for the purpose of reducing power consumption.

Furthermore, when it is determined that the far-off interfering wave Z1 is occurring, the controller 20 supplies the loop band adjustment signal BC indicating the narrow band $B_{NA}$ to the charge pump circuit 212 and the loop filter 213 of the local oscillation circuit 21. Thus, the loop band of the loop filter 213 is set at the narrowest band. Thereby, a noise component caused by the far-off interfering wave Z1 is not likely to be superimposed on the desired channel band, thus resulting in a reduction in a noise level.

When it is determined that the out-of-channel-band interfering wave Z2 is occurring, the controller 20 supplies the operation current adjustment signal PC indicating the middle current $I_M$ to the input circuit 300 of each of the amplifier 11, the mixer 12, the LPF 13, and the channel selection BPF 14. Thus, the input circuit 300 performs an amplification process of the input signal by the middle current output transistor Q2 among three transistors Q1 to Q3. Note that, the channel selection BPF 14 can remove the out-of-channel-band interfering wave Z2, though the LPF 13 cannot completely remove the out-of-channel-band interfering wave Z2. Therefore, in order to enhance the resistance to the interfering wave in each of the amplifier 11, the mixer 12, the LPF 13, and the channel selection BPF 14, as compared with the case of amplifying the input signal by the small current output transistor Q1 as described above, the controller 20 makes the operation current of the input circuit 300 larger than the operation current when the far-off interfering wave Z1 occurs as described above.

Furthermore, when it is determined that the out-of-channel-band interfering wave Z2 is occurring, the controller 20 supplies the loop band adjustment signal BC indicating the wide band $B_{WD}$ to the charge pump circuit 212 and the loop filter 213 of the local oscillation circuit 21. Thus, the loop band of the loop filter 213 is set at the widest band. By widening the loop band of the loop filter 213, a noise component caused by an interfering wave existing in the pass band of the LPF 13, that is, having a frequency near the channel band that the user desires to receive, such as the out-of-channel-band interfering wave Z2, is dispersed into this wide band. Thereby, it is possible to reduce the level of a noise superimposed on the channel band that the user desires to receive.

When it is determined that the in-channel-band interfering wave Z3 is occurring, the controller 20 supplies the operation current adjustment signal PC indicating the large current $I_H$ to the input circuit 300 of each of the amplifier 11, the mixer 12, the LPF 13, and the channel selection BPF 14. Thus, the input circuit 300 performs an amplification process of the input signal by the large current output transistor Q3 among the three transistors Q1 to Q3. Neither the LPF 13 nor the channel selection BPF 14 can remove the in-channel-band interfering wave Z3. Therefore, in order to maximize the resistance to the interfering wave in each of the amplifier 11, the mixer 12, the LPF 13, and the channel selection BPF 14, the controller 20 controls to maximize the operation current of the input circuit 300.

Furthermore, when it is determined that the in-channel-band interfering wave Z3 is occurring, the controller 20 supplies the loop band adjustment signal BC indicating the wide band $B_{WD}$ to the charge pump circuit 212 and the loop filter 213 of the local oscillation circuit 21, just as in the case of the occurrence of the out-of-channel-band interfering wave Z2. Thus, the loop band of the loop filter 213 is set at the widest band. By widening the loop band of the loop filter 213, a noise component caused by interfering wave existing in the channel band that the user desires to receive, such as the in-channel-band interfering wave Z3, is dispersed into this wide band. Thereby, it is possible to entirely reduce a noise level superimposed on the channel band that the user desires to receive.

As described above, in the receiver 100 shown in FIG. 1, when the interfering wave exists in the channel band, the operation current of the input circuit 300 is increased in each of the amplifier 11, the mixer 12, the LPF 13, and the channel selection BPF 14 to enhance the resistance to the interfering wave. On the other hand, when the interfering wave exists out of the channel band, the operation current of the input circuit 300 is decreased in each of the amplifier 11, the mixer 12, the LPF 13, and the channel selection BPF 14 to reduce electric power consumption.

Therefore, according to the present invention, it is possible to provide the receiver that is resistant to adverse effects of the interfering waves, irrespective of the levels of the interference waves, and able to reduce electric power consumption.

In the above embodiment, to adjust the loop band of the loop filter 213 of the PLL circuit 210 on the basis of the loop band adjustment signal BC, the output current amount of the charge pump circuit 212, in addition to the loop filter 213, is controlled, but only one of the charge pump circuit 212 and the loop filter 213 may be controlled. In other words, the loop band of the loop filter 213 may be directly controlled on the basis of the loop band adjustment signal BC, or the output current amount of the charge pump circuit 212 may be controlled on the basis of the loop band adjustment signal BC.

In the above embodiment, the operation current of the input circuit 300 that is contained in each circuit (i.e., the amplifier 11, the mixer 12, the LPF 13, and the channel selection BPF 14) described above is controlled on the basis of the operation current adjustment signal PC. However, the operation current of an output circuit or a main circuit (not shown) that is contained in each circuit may be controlled instead. In other words, the present invention may have any structure as long as an operation current for operating a circuit is controlled in the receiver 100 on the basis of the operation current adjustment signal PC.

Further, it is not necessary to control the operation current for all the amplifier 11, the mixer 12, the LPF 13, and the channel selection BPF 14. In other words, the operation current has only to be controlled in at least one of the amplifier 11, the mixer 12, the LPF 13, and the channel selection BPF 14 in accordance with the operation current adjustment signal PC, as shown in FIG. 3.

In short, the receiver 100 has only to be provided with an amplifying circuit (11), a mixing circuit (12), a local oscillation circuit (21), a low-pass filter circuit (13), a band-pass filter circuit (14), the controller 20, and an interfering wave determining unit (204) as described below.

The amplifying circuit amplifies a received high frequency signal (RF) to obtain a reception signal (AR). The local oscillation circuit generates a local oscillation signal (FQ). The mixing circuit mixes the reception signal with the local oscillation signal to generate a first intermediate frequency signal (IF). The low-pass filter circuit obtains a component of a low frequency band of the first intermediate frequency signal (IFL). The band-pass filter circuit obtains a component of a desired channel band of the second intermediate frequency signal (IFL), as a selected intermediate frequency signal (IFX).

When the level of the second intermediate frequency signal is lower than a first threshold value (THa) and the level of the selected intermediate frequency signal is lower than a second threshold value (THb), as shown in FIG. 3, the interfering wave determining unit determines that the far-off interfering wave exists out of the low frequency band. When the level of the second intermediate frequency signal is equal to or higher than the first threshold value and the level of the selected intermediate frequency signal is lower than the second threshold value, as shown in FIG. 3, the interfering wave determining unit determines that the out-of-channel-band interfering wave exists out of the channel band. When the level of the second intermediate frequency signal is equal to or higher than the first threshold value and the level of the selected intermediate frequency signal is equal to or higher than the second threshold value, as shown in FIG. 3, the interfering wave determining unit determines that the in-channel-band interfering wave exists in the channel band.

When it is determined that the far-off interfering wave exists, the controller makes the operation current of at least one of the amplifying circuit, the local oscillation circuit, the mixing circuit, the low-pass filter circuit, and the band-pass filter circuit lower than that in a case where it is determined that the out-of-channel-band interfering wave or the in-channel-band interfering wave exists. More specifically, as shown in FIG. 3, the controller sets the operation current of at least one of the circuits at a small current ($I_L$), when it is determined that the far-off interfering wave exists. When it is determined that the out-of-channel-band interfering wave exists, the controller sets the operation current of at least one of the circuits at a middle current ($I_M$) that is larger than the small current. When it is determined that the in-channel-band interfering wave exists, the controller sets the operation current of at least one of the circuits at a large current ($I_H$) that is larger than the middle current.

This application is based on a Japanese Patent Application No. 2014-262468 which is hereby incorporated by reference.

What is claimed is:

1. A receiver comprising:
   an amplifying circuit for amplifying a received high frequency signal to obtain a reception signal;
   a local oscillation circuit for generating a local oscillation signal;
   a mixing circuit for mixing the reception signal with the local oscillation signal to generate a first intermediate frequency signal;
   a low-pass filter circuit for obtaining a component of a low frequency band of the first intermediate frequency signal, as a second intermediate frequency signal;
   a band-pass filter circuit for obtaining a component of a desired channel band of the second intermediate frequency signal, as a selected intermediate frequency signal;
   an interfering wave determining unit for determining that a far-off interfering wave exists out of the low frequency band when a level of the second intermediate frequency signal is lower than a first threshold value and a level of the selected intermediate frequency signal is lower than a second threshold value, determining that an out-of-channel-band interfering wave exists out of the desired channel band when the level of the second intermediate frequency signal is equal to or higher than the first threshold value and the level of the selected intermediate frequency signal is lower than the second threshold value, and determining that an in-channel-band interfering wave exists in the desired channel band when the level of the second intermediate frequency signal is equal to or higher than the first threshold value and the level of the selected intermediate frequency signal is equal to or higher than the second threshold value; and a controller that, when the interfering wave determining unit has determined that the far-off interfering wave exists, makes an operation current of at least one circuit among the amplifying circuit, the mixing circuit, the low-pass filter circuit, and the band-pass filter circuit lower than that in a case where it is determined that the out-of-channel-band interfering wave or the in-channel-band interfering wave exists.

2. The receiver according to claim 1, wherein
when it is determined that the far-off interfering wave exists, the controller sets the operation current of the at least one circuit at a small current;
when it is determined that the out-of-channel-band interfering wave exists, the controller sets the operation current of the at least one circuit at a middle current larger than the small current; and
when it is determined that the in-channel-band interfering wave exists, the controller sets the operation current of the at least one circuit at a large current larger than the middle current.

3. The receiver according to claim 1, wherein
the at least one circuit includes an input circuit for amplifying an input signal; and
the input circuit includes:
  a first transistor;
  a second transistor larger than the first transistor in transistor size;
  a third transistor larger than the second transistor in transistor size; and
  a switch for making the first transistor among the first to third transistors amplify the input signal when it is determined that the far-off interfering wave exists, making the second transistor among the first to third transistors amplify the input signal when it is determined that the out-of-channel-band interfering wave exists, and making the third transistor among the first to third transistors amplify the input signal when it is determined that the in-channel-band interfering wave exists.

4. The receiver according to claim 1, wherein
the local oscillation circuit includes a phase comparator for generating a phase difference signal that corresponds to a phase difference between a divided oscillation signal in which a frequency of the local oscillation signal is divided and a reference clock signal, a charge pump circuit for feeding an output current corresponding to the phase difference signal to a first line, a loop filter for smoothing a voltage of the first line to generate a control voltage, and a VCO for producing a signal having a frequency corresponding to the control voltage as the local oscillation signal;
when it is determined that the far-off interfering wave exists, the controller sets a loop band of the loop filter at a narrow band; and
when it is determined that the out-of-channel-band interfering wave or the in-channel-band interfering wave exists, the controller sets the loop band of the loop filter at a wide band that is wider than the narrow band.

5. The receiver according to claim 4, wherein the controller sets the output current of the charge pump circuit at a small current to set the loop band of the loop filter at the narrow band, while the controller sets the output current of the charge pump circuit at a large current that is larger than the small current to set the loop band of the loop filter at the wide band.

6. A receiving method of a receiver, the receiver including an amplifying circuit for amplifying a received high frequency signal to obtain a reception signal; a local oscillation circuit for generating a local oscillation signal; a mixing circuit for mixing the reception signal with the local oscillation signal to generate a first intermediate frequency signal; a low-pass filter circuit for obtaining a component of a predetermined low frequency band of the first intermediate frequency signal, as a second intermediate frequency signal; and a band-pass filter circuit for obtaining a component of a desired channel band of the second intermediate frequency signal, as a selected intermediate frequency signal, the receiving method comprising:
an interfering wave determining step of determining that a far-off interfering wave exists out of the low frequency band when a level of the second intermediate frequency signal is lower than a first threshold value and a level of the selected intermediate frequency signal is lower than a second threshold value, determining that an out-of-channel-band interfering wave exists out of the desired channel band when the level of the second intermediate frequency signal is equal to or higher than the first threshold value and the level of the selected intermediate frequency signal is lower than the second threshold value, and determining that an in-channel-band interfering wave exists in the desired channel band when the level of the second intermediate frequency signal is equal to or higher than the first threshold value and the level of the selected intermediate frequency signal is equal to or higher than the second threshold value; and
a control step of, when it is determined that the far-off interfering wave exists in the interfering wave determining step, making an operation current of at least one circuit among the amplifying circuit, the mixing circuit, the low-pass filter circuit, and the band-pass filter circuit lower than that in a case where it is determined that the out-of-channel-band interfering wave or the in-channel-band interfering wave exists.

7. The receiving method of the receiver according to claim 6, wherein the control step includes the steps of:
setting the operation current of the at least one circuit at a small current, when it is determined in the interfering wave determining step that the far-off interfering wave exists;
setting the operation current of the at least one circuit at a middle current larger than the small current, when it is determined in the interfering wave determining step that the out-of-channel-band interfering wave exists; and
setting the operation current of the at least one circuit at a large current larger than the middle current, when it is determined in the interfering wave determining step that the in-channel-band interfering wave exists.

8. The receiving method of the receiver according to claim 6, wherein
the local oscillation circuit includes a phase comparator for generating a phase difference signal that corresponds to a phase difference between a divided oscillation signal in which the frequency of the local oscillation signal is divided and a reference clock signal, a charge pump circuit for feeding an output current corresponding to the phase difference signal to a first line, a loop filter for smoothing a voltage of the first line to generate a control voltage, and a VCO for generating a signal having a frequency corresponding to the control voltage as the local oscillation signal; and the control step includes:
- a narrow band setting step for setting a loop band of the loop filter at a narrow band, when it is determined in the interfering wave determining step that the far-off interfering wave exists; and
- a wide band setting step for setting the loop band of the loop filter at a wide band that is wider than the narrow band, when it is determined in the interfering wave determining step that the out-of-channel-band interfering wave or the in-channel-band interfering wave exists.

9. The receiving method of the receiver according to claim 8, wherein in the narrow band setting step, the loop band of the loop filter is set at the narrow band by setting the output current of the charge pump circuit at a small current; and in the wide band setting step, the loop band of the loop filter is set at the wide band by setting the output current of the charge pump circuit at a large current that is larger than the small current.

* * * * *